(12) United States Patent
Charych

(10) Patent No.: US 6,798,716 B1
(45) Date of Patent: Sep. 28, 2004

(54) SYSTEM AND METHOD FOR WIRELESS ELECTRICAL POWER TRANSMISSION

(75) Inventor: Arthur Charych, Setauket, NY (US)

(73) Assignee: BC Systems, Inc., Setauket, NY (US)

(*) Notice: Subject to any disclaimer, the term of this patent is extended or adjusted under 35 U.S.C. 154(b) by 0 days.

(21) Appl. No.: 10/465,431

(22) Filed: Jun. 19, 2003

(51) Int. Cl.[7] .................................................. G01S 3/80
(52) U.S. Cl. .................................................... 367/119
(58) Field of Search ............................... 367/118, 119, 367/138; 320/107, 114, 137

(56) References Cited

U.S. PATENT DOCUMENTS 4,082,097 A * 4/1978 Mann et al. ................. 320/108
5,300,875 A * 4/1994 Tuttle ........................... 320/138
5,889,383 A * 3/1999 Teich ........................... 320/107
5,982,139 A * 11/1999 Parise .......................... 320/109
6,342,776 B1 * 1/2002 Taylor et al. ................ 320/137

FOREIGN PATENT DOCUMENTS

JP          409135832       * 5/1997
JP          02002306491     * 10/2002

* cited by examiner

*Primary Examiner*—Daniel Pihulic
(74) *Attorney, Agent, or Firm*—Brown & Michaels, PC (57) ABSTRACT

A power transmission system using directional ultrasound for power transmission includes a transmitting device and a receiving device. The transmitting device has a set of ultrasound transducers forming an ultrasound transducer array, wherein the array is a set of spaced individual transducers placed in the X-Y plane disposed to generate an ultrasound beam in the Z direction.

10 Claims, 11 Drawing Sheets

Generic electrical power transmission system

Fig. 1

Generic electrical power transmission system

Ultrasound Transducer Array

Fig. 3

Receiving Device Interface

Fig. 4

Receiving Device Position Measurement

First Phase Shifter Waveforms

Fig. 7

Second Phase Shifter Waveforms

Fig. 8

Ultrasound Transducer Driver

Fig. 9

Ultrasound Transducer Waveforms

Fig. 10

Beam Position control Circuits

SYSTEM AND METHOD FOR WIRELESS ELECTRICAL POWER TRANSMISSION

FIELD OF THE INVENTION

This invention is related to the transmission of electrical power between electronic devices without the use of wires. More specifically, the present invention pertains to the transmission of electrical power between electronic devices using ultrasound.

BACKGROUND OF THE INVENTION

Conventional power transfer into electronic devices requires these devices to be plugged into an electrical outlet. While wireless data transmission is commonplace, wireless power transmission is not, except at extremely low power levels. This is because conventional wireless transmission of electrical power is via electromagnetic waves, which spread the available energy so that only a tiny fraction is available at the receiving end. A significant number of wireless battery chargers use magnetic induction rather than sound energy— e.g. Phillips cordless toothbrush works that way, for example.

In order for any meaningful power to be available at the receiver, the power level at the transmitter becomes impractically high. Any attempt to focus the energy so that the amount of power at the transmitter becomes manageable, requires physically large antennas because the focusing antennas have to be many times larger than the wavelength of the transmitted radiation. There are also issues relating to safety, and electromagnetic interference to other electronic devices.

The use of piezoelectric transducers to convert one form of sound energy or another into electricity is known. In some cases, the sound energy is ambient sound around the device.

U.S. Pat. No. 6,342,776 by Taylor et al. entitled ACOUSTIC CHARGER FOR ELECTRONIC DEVICES Teaches means for charging the battery of an electronic device by converting acoustic energy to electrical current.

U.S. Pat. No. 5,889,383 by Teich, entitled SYSTEM AND METHOD FOR CHARGING BATTERIES WITH AMBIENT ACOUSTIC ENERGY, teaches a system and method for charging rechargeable batteries using power from ambient acoustic waves.

The use of ultrasonic for transmission of power to charge a battery in the pacemaker or RFID tag is known.

U.S. Pat. No. 4,082,097, by Mann, et al. entitled, MULTIMODE RECHARGING SYSTEM FOR LIVING TISSUE STIMULATORS, teaches a system being disclosed for controlling the charging of a rechargeable battery in an implanted human tissue stimulator by means of an external power source. Included in the stimulator are battery protection devices designed to sense the state of charge of the battery and limit the charging current amplitude so as not to exceed a selected maximum based on different criteria including battery state of charge signals from the implanted stimulator which are indicative of the current amplitude and battery state of charge from one of the protection devices are transmitted to an external unit Based on these signals the external unit is operated in one of a plurality of modes to cause the battery to be charged by a current with an optimum safe amplitude irrespective of determined failure of one or more of the battery protection devices. Mann patent assumed that the charging energy is supplied by magnetic induction. It also mentioned means other than magnetic induction. Such as energy may be transferred by light waves, visible or infrared, using solar cells or other light to current flow energy transducers as the pickup device. Also, energy transfer may be by means of sound or vibration waves (subaudible, audible or ultrasonic) by using a piezoelectric crystal or other vibration to current energy flow transducers.

U.S. Pat. No. 5,300,875, by Tuttle, et al. entitled, PASSIVE (NON-CONTACT) RECHARGING OF SECONDARY BATTERY CELL(S) POWERING RFID TRANSPONDER TAGS, teaches a concept of passively recharging the battery of battery backed electronic circuits and in particular utilizing these methods to recharge an RFID transponder's secondary cell(s). The invention particularly relates to battery backed transponders which contain rechargeable batteries wherein the recharging circuitry of the present invention allows for passive (non-contact) recharging of a battery residing in a transponder unit that may or may not be directly accessible for handling. The passive recharging strategies disclosed include utilizing energy sources such as: 1) a radio frequency (rf) signal generated outside the package; 2) a seismic geophone; 3) seismic piezoelectric accelerometers; 4) photovoltaic cells located outside of the transponder package; 5) infrared p-v cells located inside of the package driven by the heated package; and/or 5) acoustic energy (sonic and ultrasonic) coupled to the recharging circuitry via an acoustic transducer.

Wireless power transmission using microwaves is known. U.S. Pat. No. 5,982,139 and 6,1 AC power source 14,824, by Parise, et al. entitled REMOTE CHARGING SYSTEM FOR A VEHICLE teaches a remote charging system for use with an electrical storage device mounted in an electric or electric/hybrid vehicle. The system includes a power transmission unit capable of transmitting electrical energy to the electrical storage device via a wireless energy beam. The vehicle includes an antenna capable of receiving the wireless energy beam and transferring the electrical energy to the storage device. The vehicle further includes a translocator for transmitting a coded signal to the power transmission unit corresponding to the location of the vehicle and thereby activating the power transmission unit. The power transmission unit receives and locks onto the coded signal and thereby tracks the vehicle during the charging operation. The translocator signal is transmitted until the electrical storage unit reaches a predetermined level of charge.

However, the Parise patent do not give any details as to how the beam is steered, other than a "translocator" on the vehicle continuously transmits while the vehicle needs charging.

Therefore, there exists a need for a electric power charging system using directional ultrasound originating from a charger device, in witch the location of a charge receiving device is first located by the charger device, thereby a predetermined charging path is established; and then the charger device is empowered to charge the charge receiving device using directional ultrasound.

SUMMARY OF THE INVENTION

A method and apparatus for converting electrical power from a power source such as a battery to electronically focused ultrasound, and converting the electronically focused ultrasound back to electrical power at a compatible receiving device is provided.

A method and apparatus for converting electrical power from a wall outlet to electronically focused ultrasound, and converting the electronically focused ultrasound back to electrical power at a compatible receiving device is provided. The compatible receiving device may be cell phone, PDA, or a notebook computer or other suitable devices.

A method and apparatus for converting electrical power from a power source as a fuel cell to electronically focused ultrasound, and converting the electronically focused ultrasound back to electrical power at a compatible receiving device is provided. The compatible receiving device may be a cell phone, a PDA, or a notebook computer or other suitable devices.

A power unit is provided in which it electronically scans the available space looking for a compatible receiving device (a cell phone, a PDA, or a notebook computer outfitted with the embodiment of this invention). Once the compatible receiving device is located, the power unit focuses its beam on the compatible receiving device, thereby delivering power thereto.

A method and apparatus for converting electrical power from a power source to electronically focused ultrasound, and converting the electronically focused ultrasound back to electrical power at a compatible receiving device is provided. In which an ultrasound transducer array having a set of spaced individual transducers is provided in the XY plane. The ultrasound transducer array generates a pencil thin ultrasound beam in the Z direction when excited by synchronous signals from the ultrasound transducer drivers.

A method and apparatus for converting electrical power from a power source to electronically focused ultrasound, and converting the electronically focused ultrasound back to electrical power at a compatible receiving device is provided. In which after the compatible receiver devices are known within a given region, the beam position electronics of the power unit switches to the power transfer mode of operation. Thereby power is transferred to the compatible receiving device using ultrasound.

Accordingly, a power transmitting device of wireless power transmission system using ultrasound is provided. The power transmitting device includes: a power receiver receiving power from a power source; and an ultrasound power unit using power derived from the power source for generating at least one directional ultrasound beam. The ultrasound power unit includes: a set of ultrasound transducers forming an ultrasound transducer array, wherein the array is a set of spaced individual transducers placed in the X-Y plane disposed to generate an ultrasound beam in the Z direction.

Accordingly a wireless power transmission system using ultrasound is provided. The wireless power transmission system includes a power transmitting device of wireless power transmission system using ultrasound. The power transmitting device has a power processor for receiving power from a power source; and an ultrasound power unit using power derived from the power source for generating at least one directional ultrasound beam. The ultrasound power unit includes: a set of ultrasound transducers forming an ultrasound transducer array, wherein the array is a set of spaced individual transducers placed in the X-Y plane disposed to generate an ultrasound beam in the Z direction; and a power receiving device disposed within having a driver and receiver control electronics for controlling a transmit/receive switch or a voltage regulator.

In power transmitting device of wireless power transmission system using ultrasound, including: a power processor receiving power from a power source; and an ultrasound power unit using power derived from the power source for generating at least one directional ultrasound beam, the ultrasound power unit including: a set of ultrasound transducers forming an ultrasound transducer array, wherein the array is a set of spaced individual transducers placed in the X-Y plane disposed to generate an ultrasound beam in the Z direction. A method is provided in which the steps of: determining a position for at least one receiving device; and sending the ultrasound beam thereto is included.

DESCRIPTION OF THE PREFERRED EMBODIMENT

Figure 1:
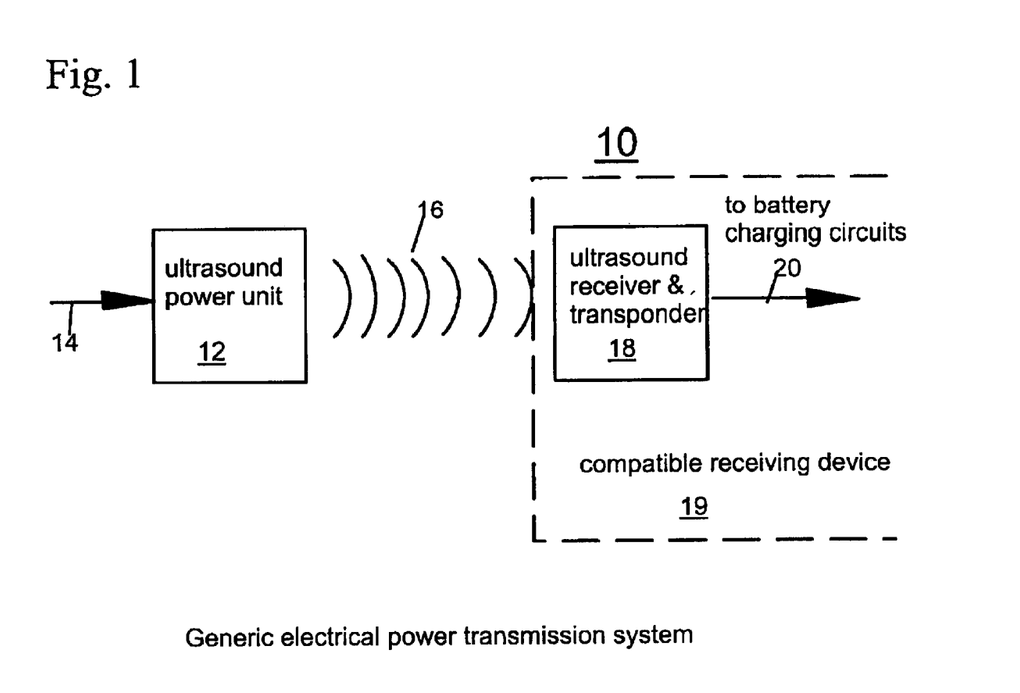
FIG. 1 shows a generic electrical power transmission system of the present invention.

The present invention, Instead of electromagnetic waves, converts electrical power from a power source such as a wall outlet to electronically focused ultrasound, as depicted in FIG. 1.

Referring to FIG. 1, wireless electrical power transmission system 10 is depicted. An ultrasound power unit 12 is provided to receive power from a power source such as AC power source 14. AC power source 14 in turn generates a directed ultrasound waves 16. Directed ultrasound waves 16 are received by ultrasound receiver and transponder circuits 18. Ultrasound receiver and transponder circuits 18 in turn convert the ultrasound energy into electric energy for battery charging circuits 20. Since ultrasound waves propagate at a much lower velocity than electromagnetic waves, ultrasound wavelengths are short, thereby requiring a very small focusing radiator, and requiring a manageable amount of power from the power source such as the wall AC outlet.

The focused ultrasound 16 is converted back to electrical power at a compatible receiving device 19 such as a cell phone, a PDA, or a notebook computer, or a Wi-Fi device where it is used to charge a local battery. In other words, ultrasound receiver and transponder 18, and battery charging circuits 20 may be incorporated in a cell phone, a PDA, or a notebook computer and other suitable devices.

As described infra, the wall outlet mounted power unit 12 electronically scans the available space looking for a compatible receiving device 19 (e.g., a cell phone, a PDA, or a notebook computer or a Wi-Fi device outfitted with the embodiment of this invention). Contact is established when the compatible receiving device 19 responds to the power unit 12, establishing its 19 position or location for charging purposes. After contact is made, the power unit 12 focuses its beam on the compatible receiving device 19, thereby delivering power to the same 19.

Occasionally, the power unit 12 scans the available space looking for new compatible receiving devices 19, or a change in position of the original receiving device 19. If another compatible receiving device 19 is detected, the power unit 12 establishes a second link for timesharing the delivery of power between the two devices. Similarly, if more than two compatible receiving devices 19 exist in the proximity for charging, multiple links may be established for time sharing in the delivery of power. Therefore, any number of compatible devices 19 may thus be accommodated.

Referring again to FIG. 1, a wireless electrical power transmission system 10 is shown. The wireless electrical power transmission system 10 includes an apparatus and method for recharging batteries of any number of portable devices 19 including cell phones, PDA's, and notebook computers, or suitable Wi-Fi devices. These portable devices 19 are placed in the vicinity or proximity (i.e. brought into the same room) of a power unit 12, which may be plugged into an electrical outlet.

Figure 2:
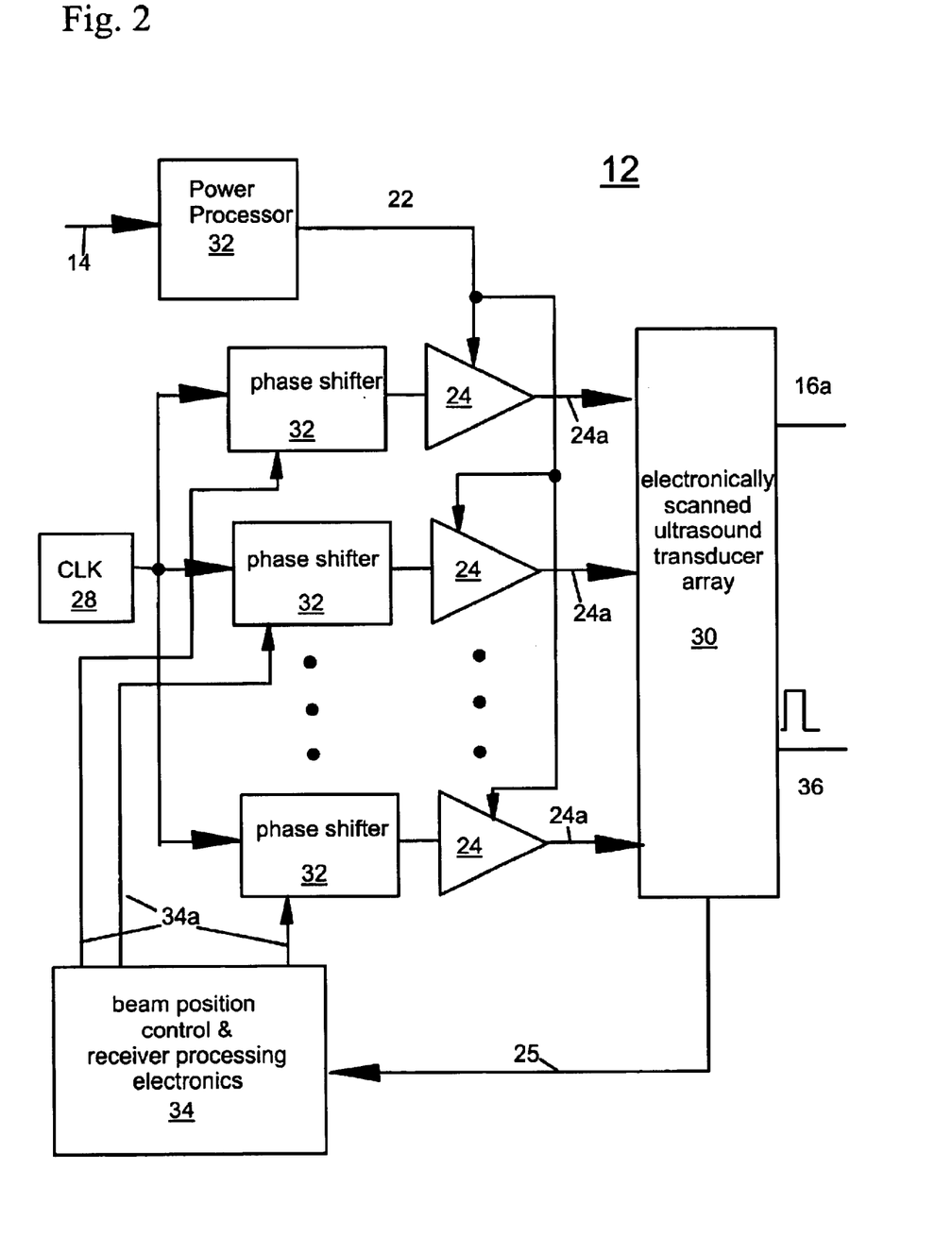
FIG. 2 shows a power unit block diagram of the present invention.
Figure 3:
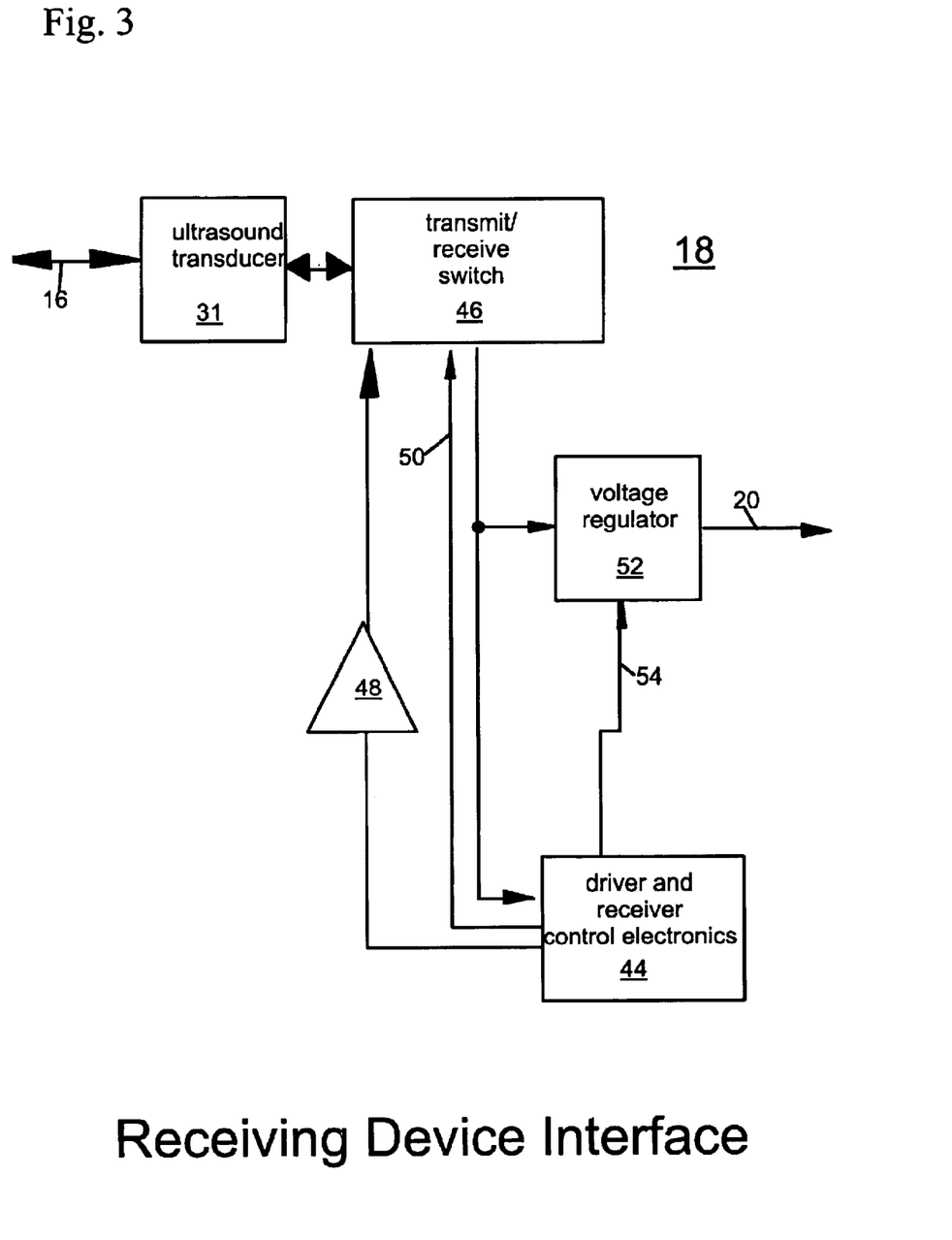
FIG. 3 shows an embodiment of a receiving device interface.

A block diagram of the details of the wireless electrical power transmission system 10 is shown in FIGS. 2 and 3.

An ultrasound power unit 12 receives electrical power from a power source. The ultrasound power unit 12 is shown in FIG. 2.

Referring to FIG. 2, a block diagram of the wall mounted power unit 12 is depicted. Electrical power 14 from the wall outlet is received by a power processor 32 of the power unit 12 which generates a DC voltage 22, which is used to power the ultrasound transducer drivers 24. These drivers 24, in turn receive timing signals from a clock generator 28, and create the proper electrical interface to drive an ultrasound transducer array 30.

In other words, AC power source 14 is subjected to a power processor 32. The resultant DC voltage 22 is fed to a set of ultrasound transducer drivers 24. ultrasound transducer drivers 24 in turn drives ultrasound transducer array 30, which generates directed ultrasound waves 16a. Array 30 also generates a receiver input 25 for feeding back the receiver information to a beam position control and receiver processing electronics block 34. A clock generator 28 generates a clock signal, which in turn is subjected to phase shifting by 32. The phase shifted signals 24a is used for positioning of an ultrasound beam 16a in a predetermined position for power transferring. Further, beam position control and receiver processing electronics block 34 also controls the extent of the phase shifting by the set of 32 via phase control 34a.

The ultrasound transducer array 30 is a set of spaced individual transducers $30_{ij}$ in the X-Y plane, which generate a pencil thin ultrasound beam 16a in the Z direction when excited by synchronous signals 24a from the ultrasound transducer drivers 24. See FIG. 2A.

Figure 2A:
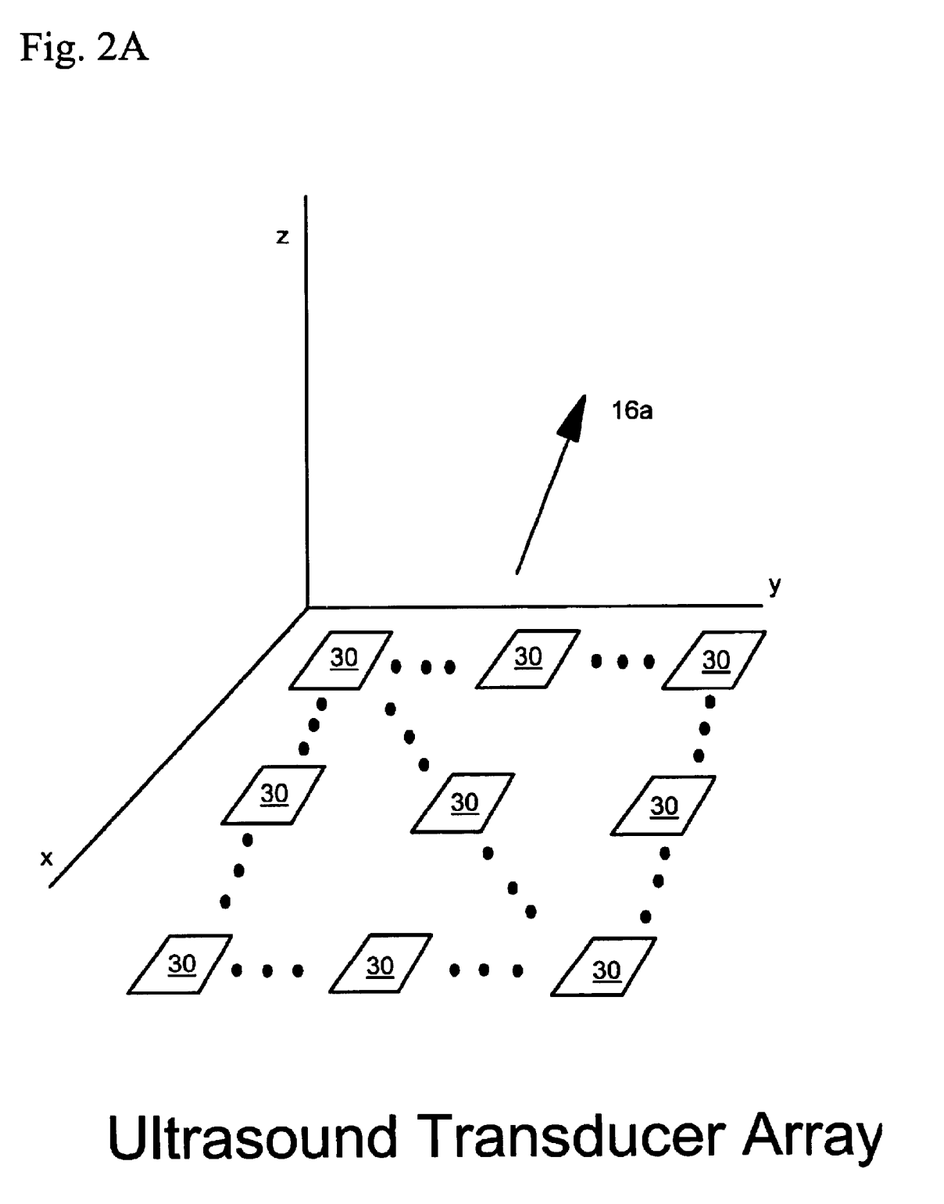
FIG. 2A shows an array of the present invention.

Referring to FIG. 2A, a pencil thin directional beam 16a is generated by the array $30_{ij}$. The set of array elements includes:

| $30_{11}$ | $30_{1j}$ | $30_{1m}$ |
|---|---|---|
| $30_{i1}$ | $30_{ij}$ | $30_{im}$ |
| $30_{n1}$ | $30_{nj}$ | $30_{nm}$ |

Where i=1, 2, . . . n; and j=1, 2, . . . m. It is noted that array $30_{ij}$ need not be a square matrix in than n may be equal to m.

The pencil thin beam 16a can be electronically moved (scanned) to any horizontal or vertical angle (or both) relative to the Z direction by introducing a phase difference among the transducer array elements $30_{ij}$. Phase shifter electronics 32 placed between the clock generator and each of the ultrasound transducer drivers 24 generates this phase difference. Beam position control electronics 34 sets the proper amount of phase shift into each of the phase shifters so as to properly position the beam 16a.

Prior to establishing contact with a compatible receiving device 19, the beam position electronics 34 incrementally moves the beam 16a and sends out an ultrasound acquisition pulse 36, and then listens for a response.

Figure 4:
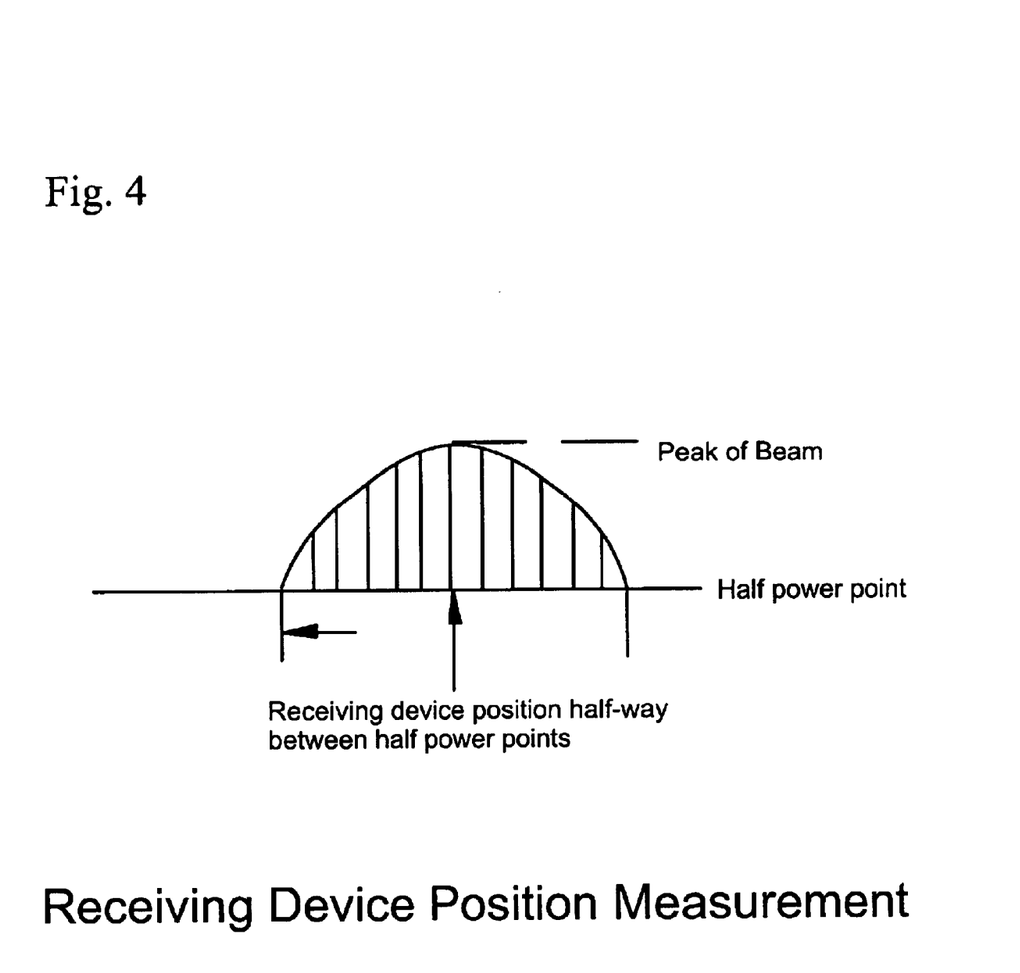
FIG. 4 shows a measurement of receiving device position of the present invention.

Referring to FIG. 3, one embodiment 40 of the ultrasound receiver and transponder circuit 18 is shown. Directional ultrasound beam 16 is received by an ultrasound transducer 31 at a compatible receiving device 19 which receives the ultrasound acquisition pulse 36. The acquisition pulse 36 is presented to the driver and receiver control electronics 44 via the Transmit/Receive switch 46. The driver and receiver control electronics sends out a reply to the acquisition pulse via the ultrasound driver 48, Transmit/Receive switch 46, and ultrasound transducer 31 if the following condition is met, i.e. the power level of the acquisition pulse 36 is above the half power point of a previously stored absolute peak of the pencil beam 16a from earlier received scans. In that way, the power unit 12 can accurately determine the angular position of the compatible receiving device 19 by measuring halfway between the received responses as shown in FIG. 4.

Referring again to FIG. 2, beam position electronics 34 of the power unit 12 may use a raster scan (similar to the scan of a television picture tube) to find and catalog the positions of all compatible receiving devices 19 within its volume of operation (typically within the room it 12 is in). It is noted that a raster scan or grid scan is a straightforward method of applying a scan to a set of items arranged in a substantially rectangular grid. Raster scan is used whenever there are no considerations for speed optimization, interdependency between elements, order of computation, or other related factors.

After all compatible receiver devices 19 within its volume of operation are known, the beam position electronics 34 of the power unit 12 (FIG. 2) switches to the power transfer mode of operation. The beam 16a is positioned at a compatible receiving device 19, and full power is applied to the ultrasound transducer array $30_{ij}$. The driver and receiver electronics 44 at the receiving device 19 (FIG. 3) sets 50 the transmit/receive switch 46 to receive, and turns on 54 the voltage regulator circuits 52. Output 56 of the voltage regulator is typically sent to battery charging circuits (not shown) of the compatible receiving device 19. If more than one compatible receiver devices 19 are catalogued, the beam position electronics 34 move the beam 16a to the other devices in a time share arrangement, transferring a portion of the available power to each device 19.

Occasionally, the beam position electronics 34 reverts back to the acquisition mode so as to make sure no changes occurred in the position of any compatible receiver devices 19. Any changes are noted for possible power sharing transfer prior to the return to the power transfer mode of operation.

Phase Shifter Electronics 32

Figure 5:
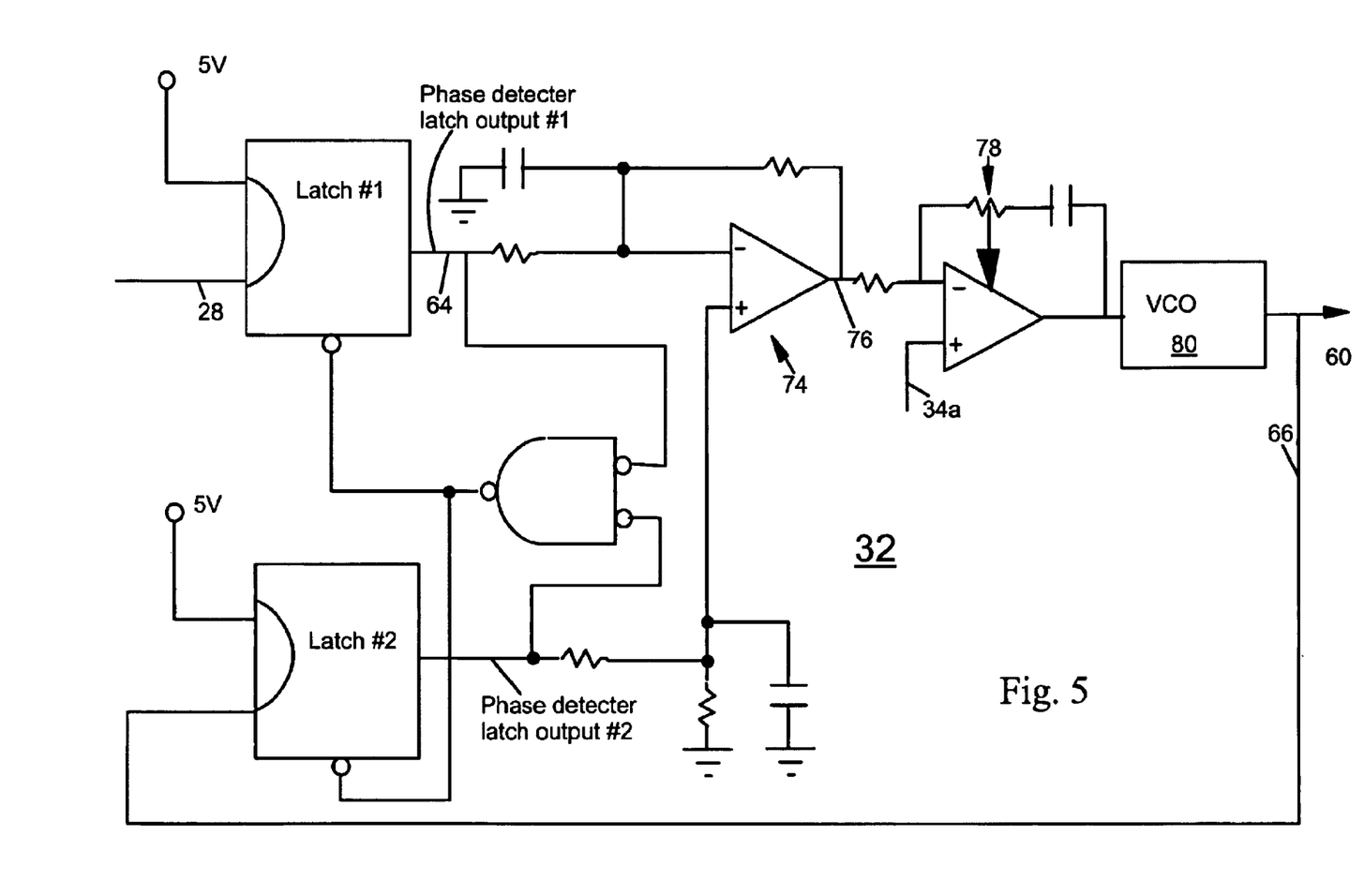
FIG. 5 shows a phase shifter of the present invention.
Figure 6:
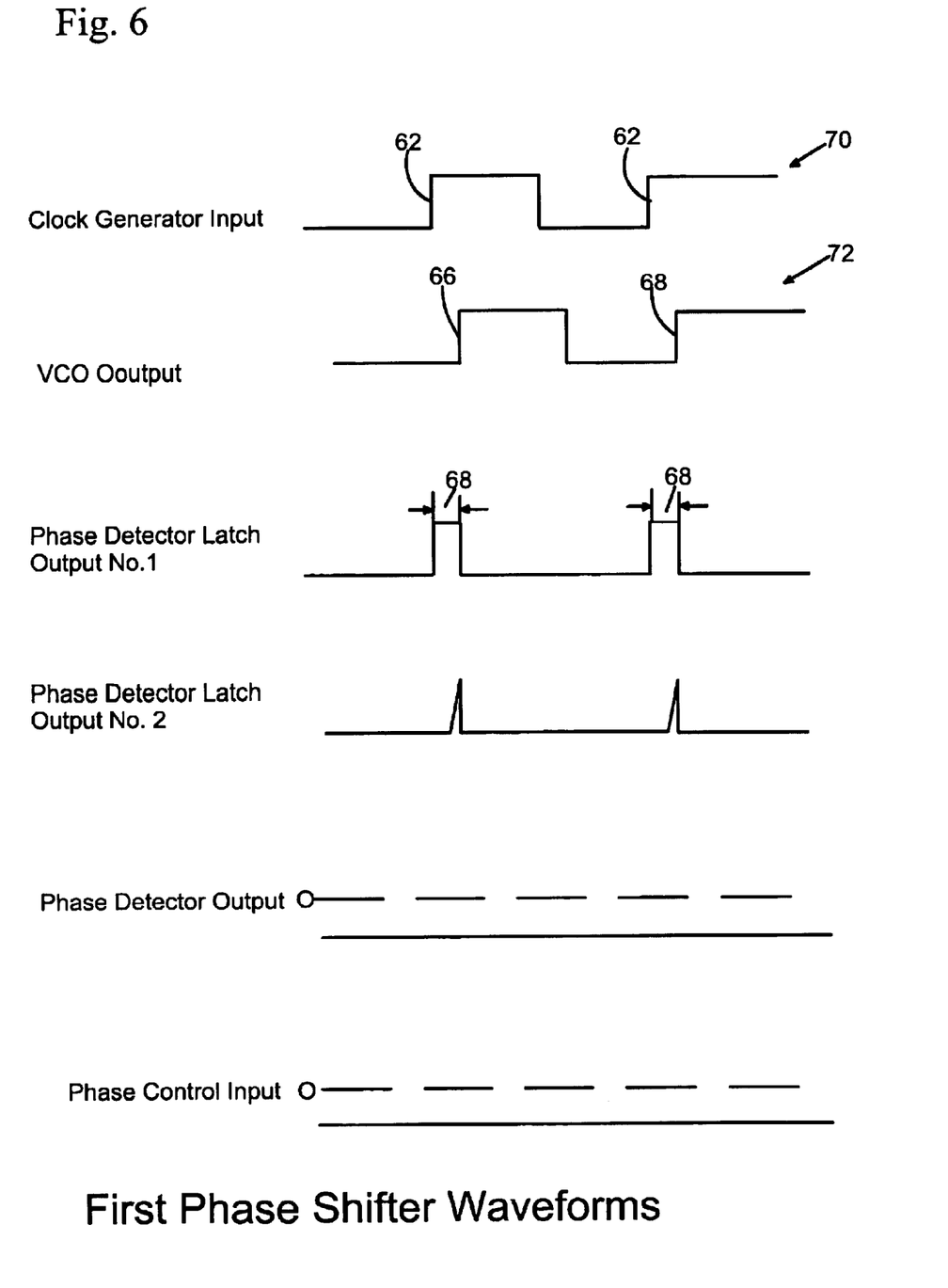
FIG. 6 shows a first phase shifter waveform of the present invention.
Figure 7:
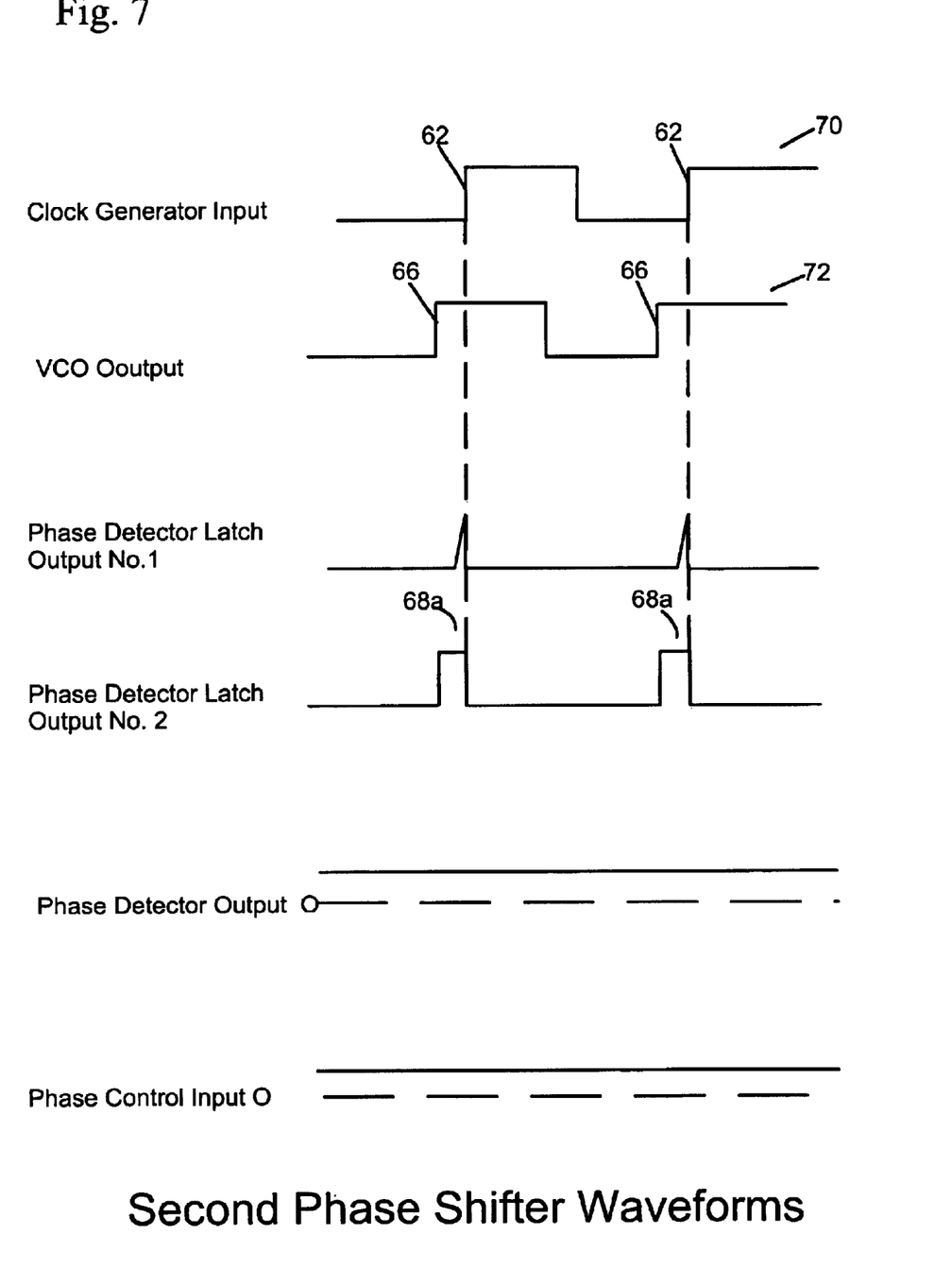
FIG. 7 shows a second phase shifter waveform of the present invention.

Details of Phase Shifter electronics 32 is shown in FIG. 5, and the pertinent waveforms are depicted in FIGS. 6 and 7.

Referring to FIGS. 5, 6, and 7, the phase shifter electronics 32 generate a difference in phase between the clock generator input 28 and the VCO output 60, which is proportional to the voltage level at the phase control input 34*a*. Detailed operation or timing chart of the phase control electronics 32 is shown in FIGS. 6 and 7. FIG. 6 pertains to a phase control input 34*a* that is a negative voltage, while FIG. 7 pertains to a phase control input 34*a* that is a positive voltage.

In FIG. 6, the leading edge 62 of the clock generator input sets latch#1, which turns on the phase detector latch output#1 64. The leading edge 66 of the VCO output 60 turns off the phase detector latch output#1. The pulse width 68 of phase detector latch output#1 is therefore proportional to the phase difference between the clock generator input 28, and VCO output 60.

The phase detector latch output#1 is then smoothed by a low pass filter 74, so as to generate a negative dc level at the phase detector output 76. This DC level is compared to the phase control input 34*a* by the error amplifier 78, which then adjusts the voltage controlled oscillator 80 such that the phase detector output 76 is equal to the phase control input 34*a*.

In FIG. 7, the leading edge 66 of the VCO output 72 sets latch#2, which turns on the phase detector latch output#2. The leading edge 62 of the clock generator input 28 turns off the phase detector latch output#2. The pulse width 68*a* of phase detector latch output#2 is therefore proportional to the phase difference between the VCO output 60, and clock generator input 28.

The phase detector latch output#2 is then smoothed by a low pass filter 78, so as to generate a positive DC level at the phase detector output 76. This DC level is compared to the phase control input 34*a* by the error amplifier 78, which then adjusts the voltage controlled oscillator 80 such that the phase detector output 76 is equal to the phase control input 34*a*.

Ultrasound Transducer Driver 24

Figure 8:
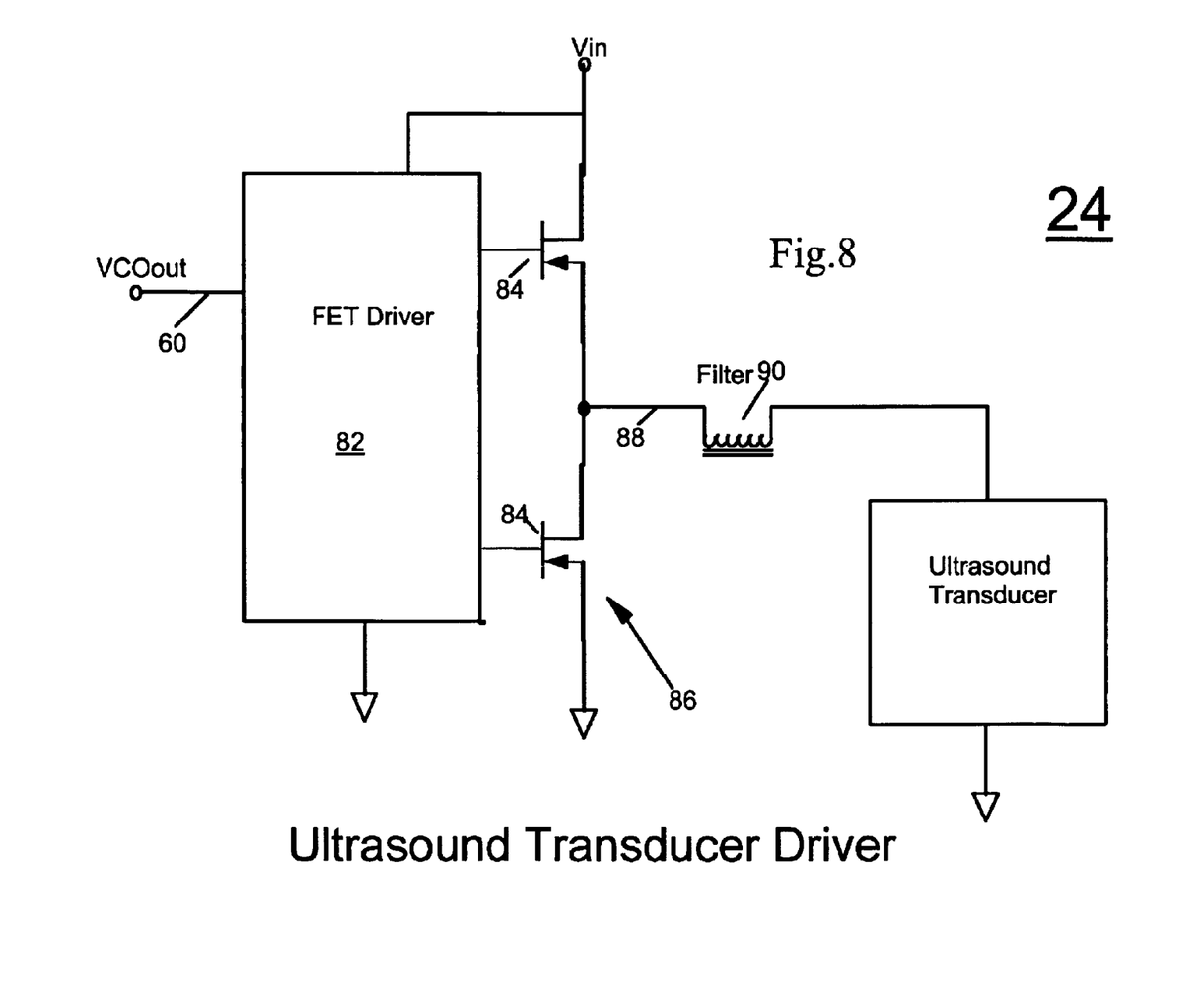
FIG. 8 shows an ultrasound transducer driver of the present invention.
Figure 9:
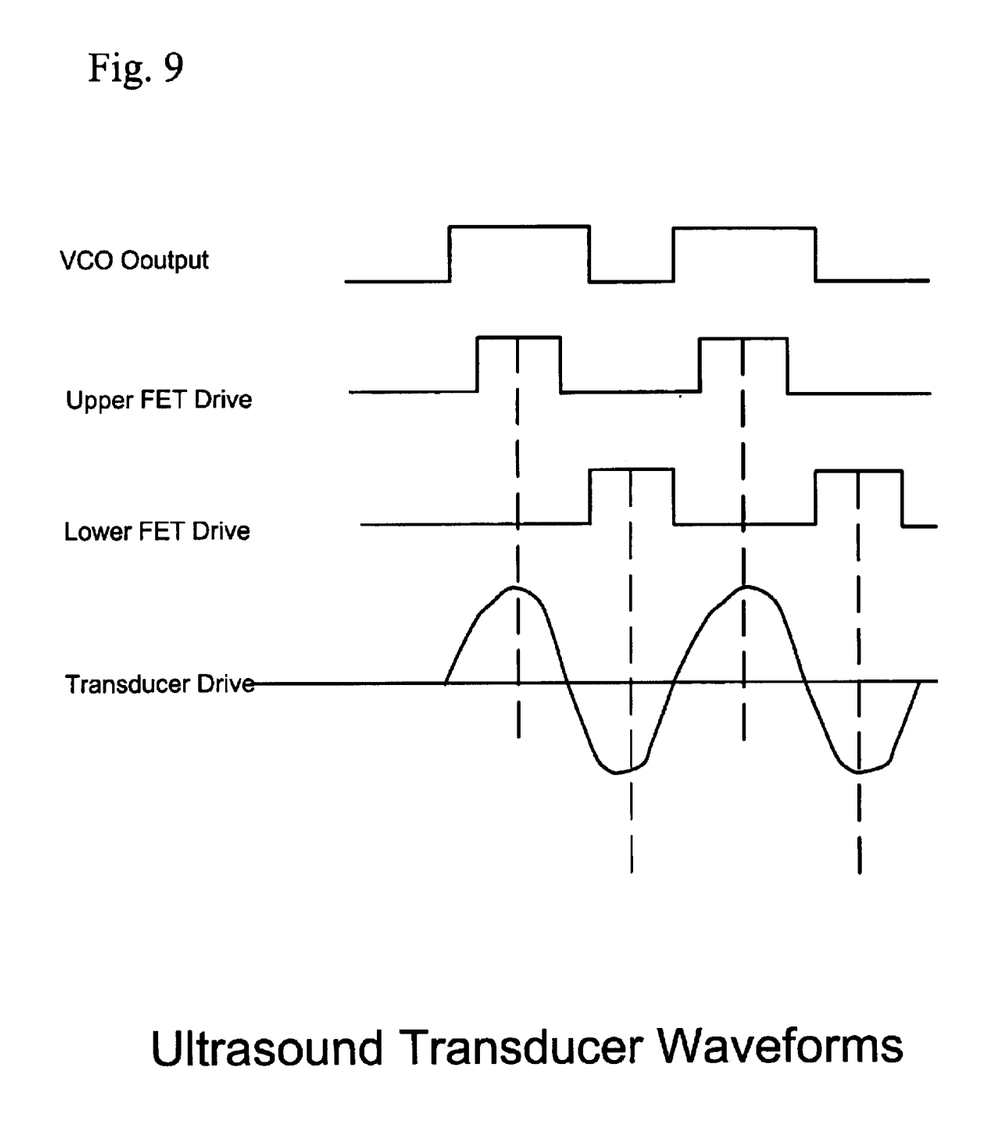
FIG. 9 shows a set of waveforms of the ultrasound transducer driver of FIG. 8.

Referring to FIGS. 8 and 9, more detailed depictions of the ultrasound transducer driver 24 and the pertinent waveforms are shown.

The VCO output 60 drives a FET driver 82, which generates non-overlapping drive signals 84 to upper and lower FET transistors. Output 88 of the FET transistors drives a filter 90 which is tuned to the operating frequency of the VCO output 60. The Transducer Drive is thus sinusoidal, and in phase with the VCO Output 60 as shown in FIG. 9.

Beam Position Control 34

Figure 10:
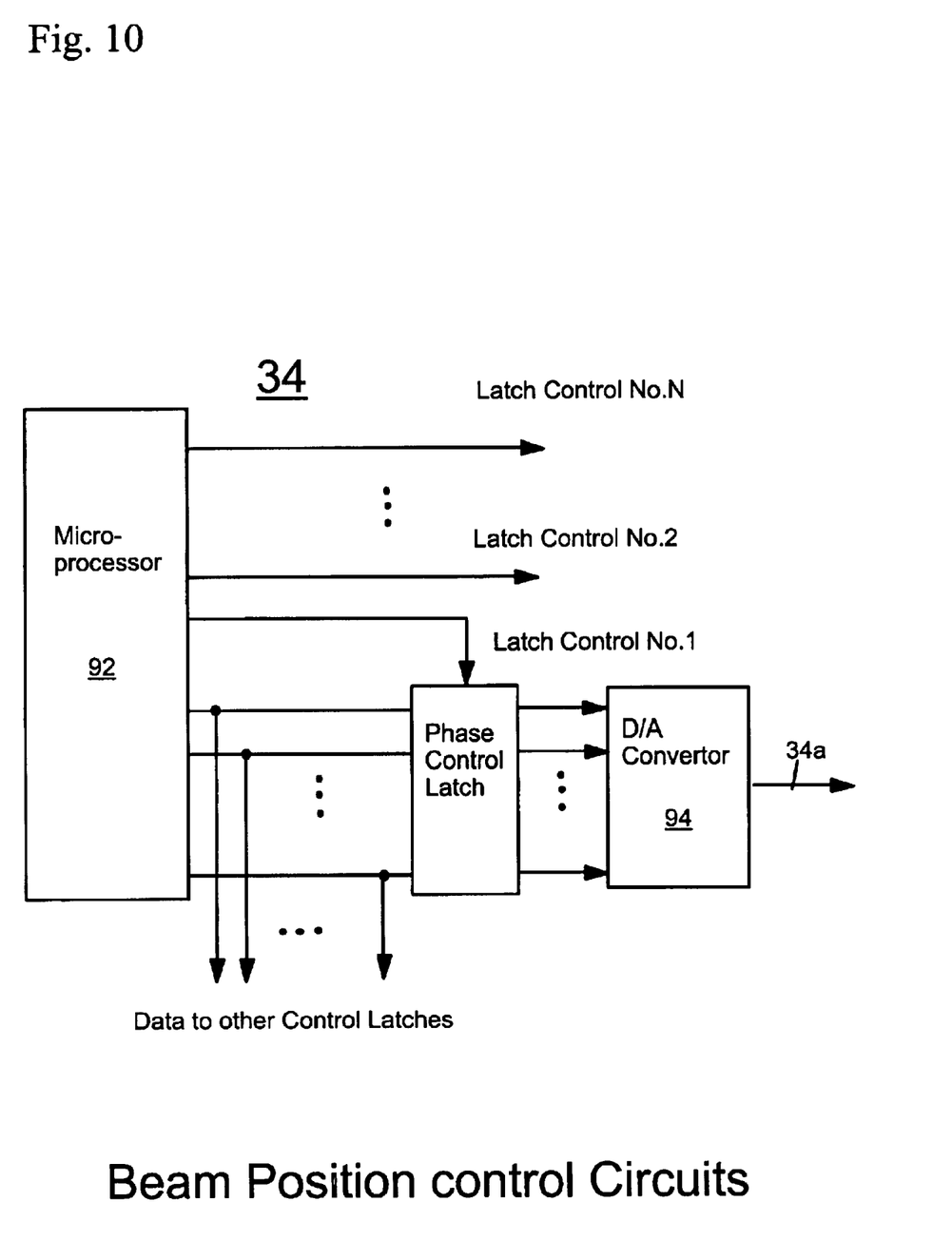
FIG. 10 shows an ultrasound beam control sub-system of the present invention.

Referring to FIG. 10, beam position control 34 (in FIG. 2) is shown in more detail. beam position control 34 includes a Microprocessor 92, which generates digital phase control data, which in turn is then loaded into a Phase Control Latch, before it is converted into an analog Phase Control signal 34*a* via an Digital to Analog converter circuit 94. Phase Control Latches for all Phase Shifters 32 are controlled in this manner so as to properly position the ultrasound beam 16*a*.

Alternatively, the present Invention can be used for the wireless transfer of power to stationary devices such as lights or any fixed location devices. In such cases, a simpler stationary beam approach can be utilized in that no periodical or repeated search of the location of a device 19 is required.

Further, compatible receiver devices 19 need not respond to the ultrasound beam 16 via their own ultrasound transmission. They may utilize any known RF data transmission techniques such as Bluetooth, IEE-802.11, or Wi-Fi. This may be more cost effective than having the ultrasound beam 16 switch from transmit mode to receive mode.

A scanned or stationary ultrasound beam 16 can also be used to power up imbedded electronic devices 19, which do not have any other sources of power. The Ultrasound beam 16 is first turned on, and then these devices can do their intended function using power derived form the beam. An example of this can be a shopping cart full of groceries, where each item has a pasted on electronic chip, which is used to identify the item. Instead of removing each item and passing it by a scanner, as is today's state of the art requires, the entire cart is scanned or illuminated with an ultrasound beam, which energizes the electronic chips causing them to respond. The entire shopping cart can thus be checked out without ever removing the items in the cart.

As can be appreciated, ultrasound power transmission is ideal for such a shopping cart application because the scanned or stationary ultrasound beam 16 can be very accurately set to illuminate only one shopping cart, without eliciting responses from other shopping carts in the vicinity. Also, ultrasound waves easily penetrate liquids, as well as solids so that one item does not shadow another item, as is the case with RF transmissions.

The powering of imbedded electronic devices 19 can be extended to a warehouse situation, where a scanned ultrasound beam 16 transmits the identity of an item it wishes to find. Only the item in question responds, when the beam scans past, energizing its imbedded electronic chip. Angular position of the beam, as well as range information to the responding item allows the item to be accurately located. Therefore, power transmission of the present invention may be used locating items or goods in a large scale operation such as a warehouse environment.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A power transmitting device of wireless power transmission system using ultrasound, comprising:
    a power processor receiving power from a power source; and
    an ultrasound power unit using power derived from the power source for generating at least one directional ultrasound beam, the ultrasound power unit including:
    a set of ultrasound transducers forming an ultrasound transducer array, wherein the array is a set of spaced individual transducers placed in the X-Y plane disposed to generate an ultrasound beam in the Z direction.

2. The device of claim 1 further comprising:
    a phase shifter for each transducer;
    a clock generator generating an input for the phase shifter;
    a controller for controlling the ultrasound beam and processing an input indicating a location of a receiving device; thereby powering the receiving device using directional ultrasound.

3. The device of claim 1, wherein the power source is an AC power source or a DC power source.

4. A wireless power transmission system using ultrasound, comprising:
    a power transmitting device of wireless power transmission system using ultrasound, comprising:
    a power processor receiving power from a power source;
    an ultrasound power unit using power derived from the power source for generating at least one directional ultrasound beam, the ultrasound power unit including:

a set of ultrasound transducers forming an ultrasound transducer array, wherein the array is a set of spaced individual transducers placed in the X-Y plane disposed to generate an ultrasound beam in the Z direction; and a power receiving device disposed within the ultrasound power unit and having a driver and receiver control electronics for controlling a transmit/receive switch or a voltage regulator.

5. The system of claim 4, wherein the power receiving device is a cell phone, a PDA, a notebook computer, or a Wi-Fi device.

6. The system of claim 4, wherein the power transmitting device further comprising:

a phase shifter for each transducer;

a clock generator generating an input for the phase shifter;

a controller for controlling the ultrasound beam and processing an input indicating a location of the receiving device; thereby powering the receiving device using directional ultrasound.

7. The system of claim 4, wherein the power source is an AC power source or a DC power source.

8. The system of claim 4, wherein the power receiving device is free from having an internal power source and is powered only by the power transmitting device.

9. A method comprising the steps of:

determining a position for at least one receiving device, in a power transmitting device of a wireless power transmission system using ultrasound, wherein the power transmitting device comprises:

a power processor receiving power from a power source; and an ultrasound power unit using power derived from the power source for generating at least one directional ultrasound beam, the ultrasound power unit including:

a set of ultrasound transducers forming an ultrasound transducer array, wherein the array is a set of spaced individual transducers placed in the X-Y plane disposed to generate an ultrasound beam in the Z direction; and sending the ultrasound beam thereto.

10. The method of claim 9, wherein the determining step includes upon receiving an ultrasound acquisition pulse by a power receiving device, the power receiving device sends out a positioning signal indicating a position of the power receiving device, thereby the at least one directional ultrasound beam is directed toward the receiving device for power transmission.

* * * * *